(12) United States Patent
Spanski

(10) Patent No.: US 7,770,682 B2
(45) Date of Patent: Aug. 10, 2010

(54) POWER ASSIST SYSTEM AND METHOD FOR A VEHICLE

(76) Inventor: Harold Spanski, 107 Grover St., Lynden, WA (US) 98264

( * ) Notice: Subject to any disclaimer, the term of this patent is extended or adjusted under 35 U.S.C. 154(b) by 241 days.

(21) Appl. No.: 11/963,619

(22) Filed: Dec. 21, 2007

(65) Prior Publication Data

US 2008/0314668 A1  Dec. 25, 2008

Related U.S. Application Data

(60) Provisional application No. 60/871,396, filed on Dec. 21, 2006.

(51) Int. Cl.
*B62M 23/02* (2010.01)
(52) U.S. Cl. .................... 180/205; 180/206; 180/207
(58) Field of Classification Search .................. 180/205, 180/206, 207
See application file for complete search history.

(56) References Cited

U.S. PATENT DOCUMENTS

| | | | | |
|---|---|---|---|---|
| 4,227,589 A | * | 10/1980 | Chika | 180/206 |
| 4,397,369 A | * | 8/1983 | Read | 180/205 |
| 5,909,781 A | * | 6/1999 | Yonekawa et al. | 180/206 |
| 5,941,332 A | * | 8/1999 | Dimick | 180/205 |
| 6,296,072 B1 | * | 10/2001 | Turner | 180/220 |
| 6,629,574 B2 | * | 10/2003 | Turner | 180/206 |
| 6,976,551 B2 | | 12/2005 | Spanski | |
| 7,207,584 B2 | * | 4/2007 | Forderhase | 280/205 |
| 7,357,209 B2 | * | 4/2008 | Kokatsu et al. | 180/206 |
| 7,386,482 B2 | * | 6/2008 | Kokatsu et al. | 705/26 |
| 2007/0137428 A1 | * | 6/2007 | Yamanaka et al. | 74/594.4 |

* cited by examiner

*Primary Examiner*—Lesley Morris
*Assistant Examiner*—Daniel Yeagley
(74) *Attorney, Agent, or Firm*—Robert B. Hughes; Hughes Law Firm, PLLC

(57) ABSTRACT

A power-assist system and method for a bicycle, comprising three main sections, namely: a motor section, a speed-reducing section, and a power-assist section. It is capable of operating in four modes, namely:
a) the power-assist pedaling mode (where the bicycle rider is pedaling to supply power and the power-assist section is also providing power);
b) the pedal only mode (where power is supplied solely by pedaling the bicycle;
c) the power-assist only mode (where the bicycle rider is not providing any power by pedaling, and all the power is supplied by the power-output section); and
d) a coasting no-power mode where the bicycle is traveling with the pedal section stationary, and no power is being delivered either by the pedal section or the power-assist drive system.

2 Claims, 9 Drawing Sheets

POWER ASSIST SYSTEM AND METHOD FOR A VEHICLE

RELATED APPLICATIONS

This application claims priority benefit of U.S. Provisional Application Ser. No. 60/871,396, filed Dec. 21, 2006, and also my U.S. Pat. No. 6,976,551 B2 is incorporated by reference.

FIELD OF THE DISCLOSURE

The present invention relates to a power assist system for a pedal powered bicycle or the like, and also a method relating to the same.

SUMMARY OF THE INVENTION

The present invention relates to a power-assist apparatus and method that is adapted for use in a bicycle or the like, and also to the combination of the bicycle or the like and the power-assist method and apparatus.

In the embodiments of the present invention there are three sections, and namely a motor section, a speed-reducing section having an operative connection to the motor section, and a power-assist section.

There are four operating modes, and these are as follows:
i. the power-assist pedaling mode (where the bicycle rider is pedaling to supply power, and the power-assist section is providing power);
ii. the pedal only mode (where power is being supplied solely by pedaling the bicycle);
iii. the power-assist only mode (where the bicycle rider is not providing any power by pedaling, and the power is supplied by the power-out section); and
iv. a coasting, no-power mode (where the bicycle is traveling with the pedal section stationary, and no power is being delivered either by the pedal section or the power-assist drive system).

DESCRIPTION OF THE PREFERRED EMBODIMENTS

Figure 1:
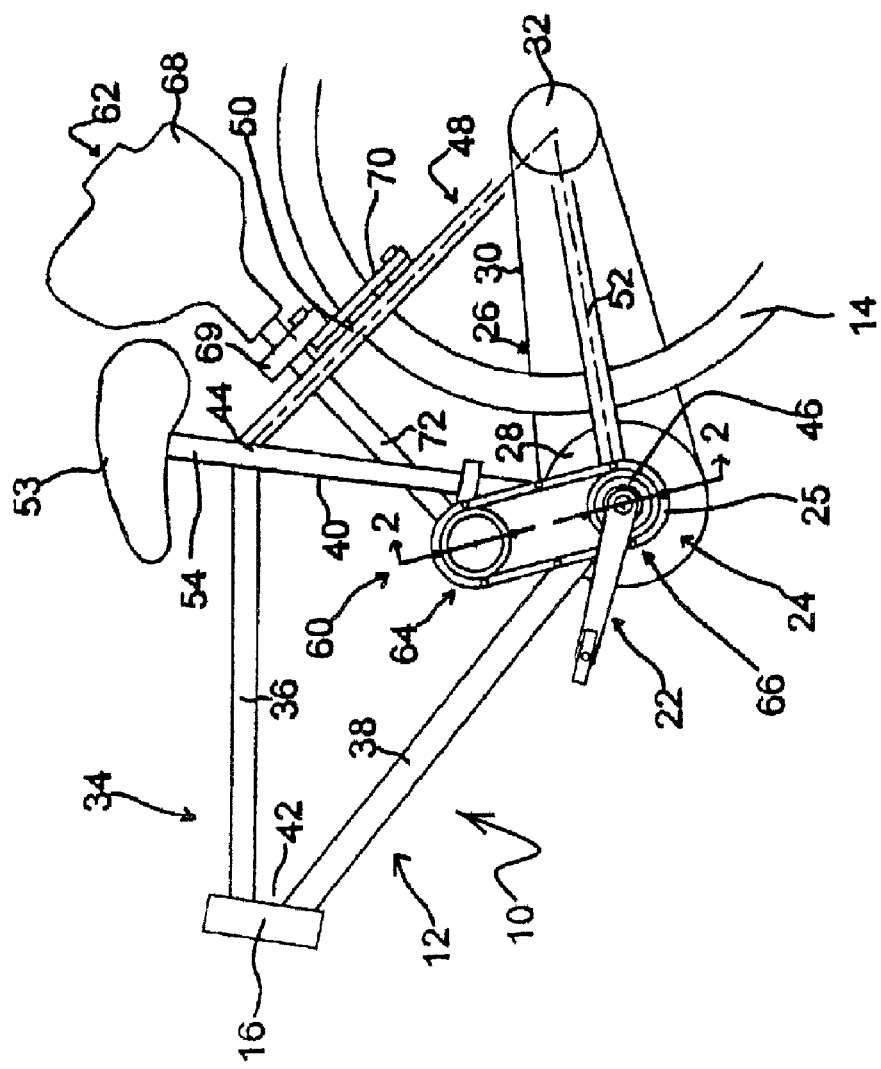
FIG. 1 is a side elevational view of a portion of a bicycle having a first embodiment of a power-assist system of the present invention installed thereon.

In FIG. 1, there is shown a bicycle 10 which comprises a frame 12, front and rear wheels, with only the rear wheel 14 being shown, and a frame mounting sleeve 16 where a handlebar (not shown) is located, and a drive section 22, comprising a pedal section 24 comprising a crank housing 25, and a sprocket section 26. The sprocket section in turn comprises a forward sprocket section 28, a drive chain 30, and a rear sprocket section 32.

The frame 12 in turn comprises a central frame section 34, which in turn comprises an upper horizontal frame member 36, a front downwardly and rearwardly slanting frame member 38, and a back frame member 40. The frame members 36 and 38 meet at a front connecting location 42 to connect to the mounting sleeve 16 of the steering column; the upper frame member 36 and the back frame member 40 meet at a back connecting location 44; and the front lower frame member 38 and the back frame member 40 connect to the crank housing 25 at a lower connecting location 46.

There is also a rear frame section 48 comprising an upper forked frame member 50 and a lower forked frame member 52. The rear ends of these two frame members 50 and 52 meet at the location of the rear sprocket section 32. The upper forward end portion of the upper forked frame member 50 connects to the back frame member 40 at approximately the back connecting location 44. The forward end of the lower forked frame member 52 has a connection to the central frame section 34 at the lower connecting location 46. There is a seat 53 supported by a seat post 54 extending upwardly from the bottom of the back frame member 40, and as is common in the prior art, this seat post 54 can comprise a separate post member telescopically mounted in the back frame member 40.

It is to be understood that the components described above already exist in the prior art. The present invention is designed so that it can be readily adapted to be incorporated in a typical bicycle configuration, such as described above, as well as other bicycle configurations.

With further reference to FIG. 1, there are shown the main components of the power-assist apparatus 60 of the present invention. These comprise three main sections, namely: a motor section 62, a speed-reducing section which in this embodiment is in the form of a speed reducing gear section 64, and a power-assist output section 66 (hereinafter called the "power-assist section 66").

It is believed that a clearer understanding of the present invention will be achieved by first identifying the four main operating modes of the apparatus of the present invention. After that, there will be a more detailed description of these components and their operation. The main operating modes are as follows:
a) the power-assist pedaling mode (where the bicycle rider is pedaling to supply power, and the power-assist section 66 is providing power);
b) the pedal only mode (where power is being supplied solely by pedaling the bicycle);
c) the power-assist only mode (where the bicycle rider is not providing any power by pedaling, and all the power is supplied by the power output section; and d) a coasting no-power mode where the bicycle is traveling with the pedal section stationary, and no power is being delivered either by the pedal section or the power-assist drive system.

The motor section 62 comprises a motor 68 mounted by a clamp 69 to an upper mounting plate 70, and having a power output shaft 71 (shown in FIG. 3) which is contained in a cylindrical mounting member 72 that extends from the motor section 62 to the speed reducing gear section 64 (see FIG. 1) so that the drive shaft extends from the motor section 62 to the speed reducing gear section 64. A connecting end portion of this drive shaft is shown at 71 (see FIG. 3). In one embodiment, the motor 68 is a gasoline powered motor having a power output of, for example, 1 to 1.5 horsepower, and capable of operating at 4000 RPM, and possibly as high as 8000 RPM, or higher.

Alternatively, the motor 68 could be an electric motor, also capable of operating at 4000 RPM or possibly higher, or other types of motors. Further, the motor 68 could be mounted to the bicycle frame 12 directly. Within the broader scope, the RPM could conceivably range from 1000, 1500, 2000, 2500, 3000, 3500, or 4000, up to higher ranges such as 4500, 5000, 5500, 6000, 7000, 8000, 9000, 10,000, 11,000, or 12,000 RPM. The horsepower could obviously vary from one-half (or below one-half), three-quarters, 1.0, 1.75, 2.0, 2.5, or 3.0 or higher. There are design options available to possibly meet certain applications or requirements, or possibly to take advantage of improvement in power sources, including electric power, etc. Since these alternative power sources are already known to those skilled in that art, these will not be discussed in this text.

The speed-reducing gear section 64 will now be described with reference to FIG. 3. The speed-reducing gear section 64 comprises a speed reducing gear section housing 76, a power input component 78, a speed-reducing gear assembly 80, and a power output component 82. The housing 76 in turn comprises an input end 84 at which there is an input housing section 86, an output end 88 having an output housing section 90 and an intermediate housing section 91. These two housing sections 86 and 91 are connected to one another at perimeter portions thereof by a first set of bolts 93, and the intermediate housing section 91 is connected to the rear housing section 90 at outer perimeter bolt locations at 101. The housing 76 has a longitudinal center axis 94.

In the following description, the term "rear" shall denote a location at, or in proximity to, the input housing section 86, and the term "front" or "forward" shall denote a location at, or in proximity to, the output housing section 90.

The rear housing section 86 has a rear end plate 96 which has a frustoconical configuration. The output housing section 90 comprises a disc shaped front end plate 100, having a perimeter portion 102, extending from the perimeter of the end plate 100 rearwardly. There are additional bolt locations 101 that extend through the forward perimeter portion 102 to connect to a forward perimeter portion 103 of the intermediate housing section 91. Positioned between the two perimeter portions 103 and 102 is a stationary ring gear flange 104. The bolt locations 101 extend through the ring gear flange 104 and the connecting plate 169 (to be discussed later in this text) to attach it rigidly to the housing 76.

The power input component 78 comprises a pinion gear 106 which is connected to the end portion of the drive shaft 71 that is driven directly from the motor section 62. The pinion gear 106 engages a matching input drive gear 108 which connects to a rear input shaft section 114 of a longitudinally extending power input shaft 116 rotatably mounted about the longitudinal axis 94. The shaft 116 also comprises a forward output shaft section 122 that connects to the forward end portion of the rear shaft section 114. The forward portion of the input shaft section 114 is supported in the intermediate housing section 91 by a rear end bearing 117. A counterweight 118 is connected to the front end portion of the rear shaft section 114. The front end of the forward shaft section 122 is mounted in a front end bearing 124. A rear seal 125 is positioned between the input shaft section 114 of the shaft 116 and the intermediate housing section 91.

At the longitudinal center portion of the shaft 116, the shaft 116 is formed with a cylindrically shaped eccentric drive portion 128 having an outer cylindrical surface 130 which is concentric with an offset center axis 132 of the eccentric drive portion 128. As the shaft 116 rotates, the offset center axis 132 orbits about the longitudinal center axis 94.

The aforementioned speed-reducing gear assembly 80 comprises a cluster gear section 136 mounted by front and rear bearings 138 and 140 to the eccentric drive portion 128 so as to be concentric with the offset center axis 132. The cluster gear section 136 comprises a first rear gear portion 142 and a second forward gear portion 144. The first gear portion 142 is positioned within the earlier mentioned surrounding fixed ring gear 104 mounted in the perimeter portion 103 of the rear housing 76. The first rear gear portion 142 has a pitch diameter moderately smaller than the inside pitch diameter of the fixed ring gear 104. With the first gear portion 142 being concentric with the offset axis 132, and with the first gear portion 142 engaging the ring gear 104, as the shaft 116 rotates about the longitudinal axis 94, the gear portion 142 has a rotating motion about the offset axis 132 and also has an orbital movement about the longitudinal axis 94.

Adjacent to, and just forwardly of, the fixed ring gear 104, there is a rotatably mounted ring gear 148 mounted within a bearing 150 which surrounds the ring gear 148 and is positioned within a forward cylindrical extension 152 of the fixed ring gear 104. Positioned within this rotatably mounted ring gear 148 is the aforementioned forward gear portion 144. The outside diameter of this forward gear portion 144 is moderately smaller than the inside diameter of the rotatable ring gear 148. Thus, with the first and second gear portions 142 and 144 being fixedly connected with one another, the rotation of the cluster gear section 136 causes the rotation of the rotatable ring gear 148 which provides the power output. The diameters of the first and second gear portions 142 and 144 and the inside diameters of the ring gears 146 and 148 are selected so that the speed reduction ratio is in the range of about 45:1 or 50:1, or, more broadly, possibly as low as 40:1, 35:1, or 30:1, or conceivably lower, or possibly as high as 55:1, 60:1, 65:1, 75:1, 80:1, 90:1, 100:1, 125:1, 150:1, 200:1, or higher.

The aforementioned output component 82 comprises a forward drive member 157 that is a forward extension of the power output ring gear 148 and fixedly connected thereto. There is an output bearing member 162 mounting the forward drive member 157. The front end of the forward shaft section 122 is supported by means of the aforementioned bearing 124.

The final output member is an output set of sprocket teeth 164 which are mounted to the forward drive member 157 so as to be positioned around, and connected to, the drive member portion 157. The upper end of a drive chain 168 (shown schematically as a broken line in FIG. 2) engages the output sprocket teeth 164 and extends downwardly therefrom to come into drive engagement with the power-assist output section 66. There is a connecting plate 169 which was discussed earlier in this text and which has as an upper circular end portion that is adjacent to the ring gear flange 104. This plate 169 extends downwardly and connects to the power assist section 66. There is a downward extension 171 (see FIG. 2) of the end plate 100 of the housing 76 that is formed as a cover to fit against the plate 169 to enclose the drive chain 168. The perimeter portion 102 of the forward output housing section 90 is provided with through openings to accommodate the drive chain 168 so that it can extend through the housing section 90 to connect to the power-assist output section 66.

We will now provide a more detailed description of the power-assist output section 66. However, before doing so, it would be helpful to review briefly the existing drive section 22 which exists in the bicycle prior to installation of the power assist apparatus of the present embodiment in the bicycle. As described briefly above in this text, this drive section 22 comprises the pedal section 24 and the drive sprocket section 26 that in turn comprises the forward sprocket section 28, a drive chain 30, and the rear sprocket section 32. In incorporating the present invention in a conventional bicycle, the existing power section remains substantially the same, but with a few modifications.

Figure 2:
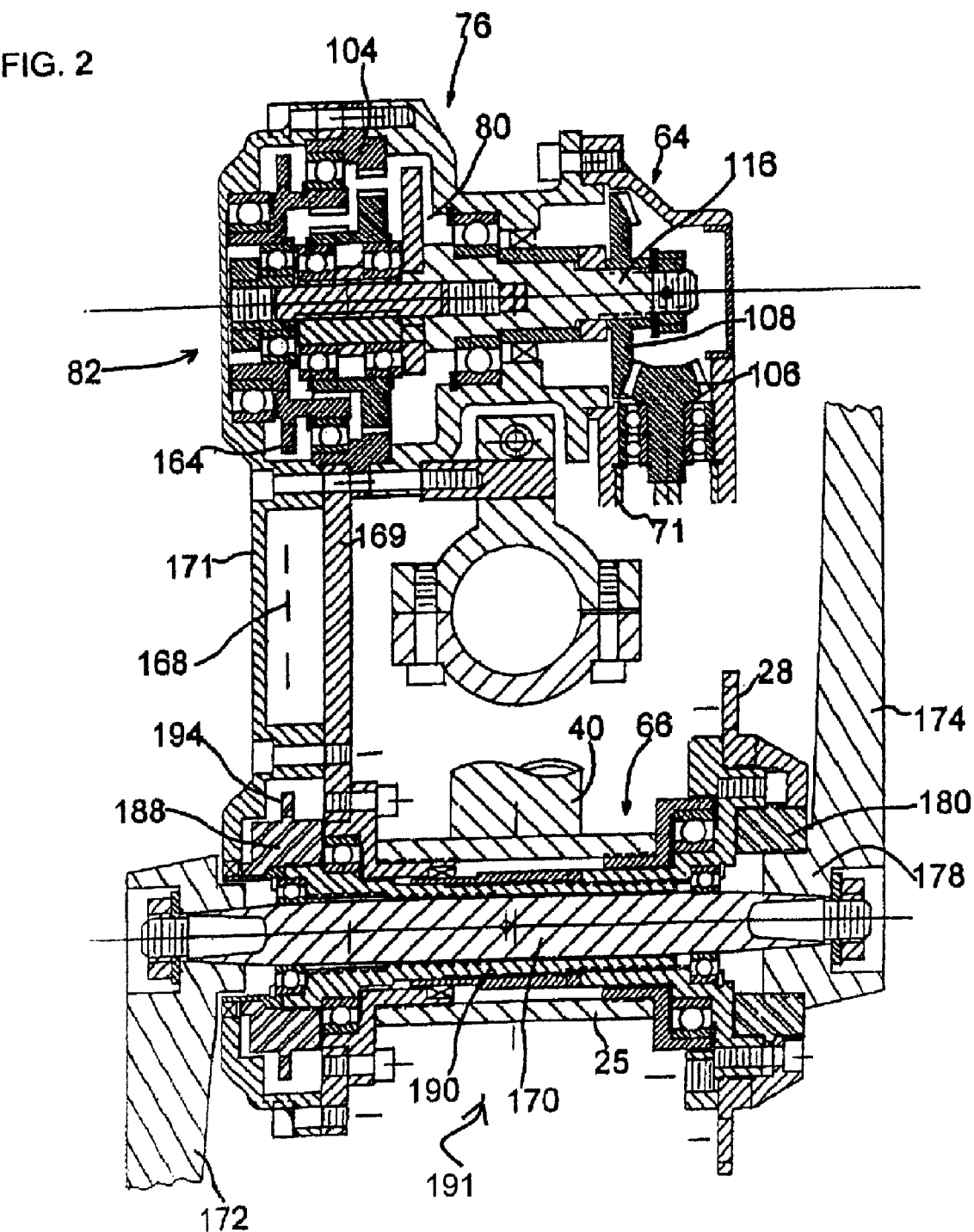
FIG. 2 is a sectional view taken primarily along line 2-2 showing the two main sections of the power assist system of FIG. 1 connected to one another in their operating environment.
Figure 4:
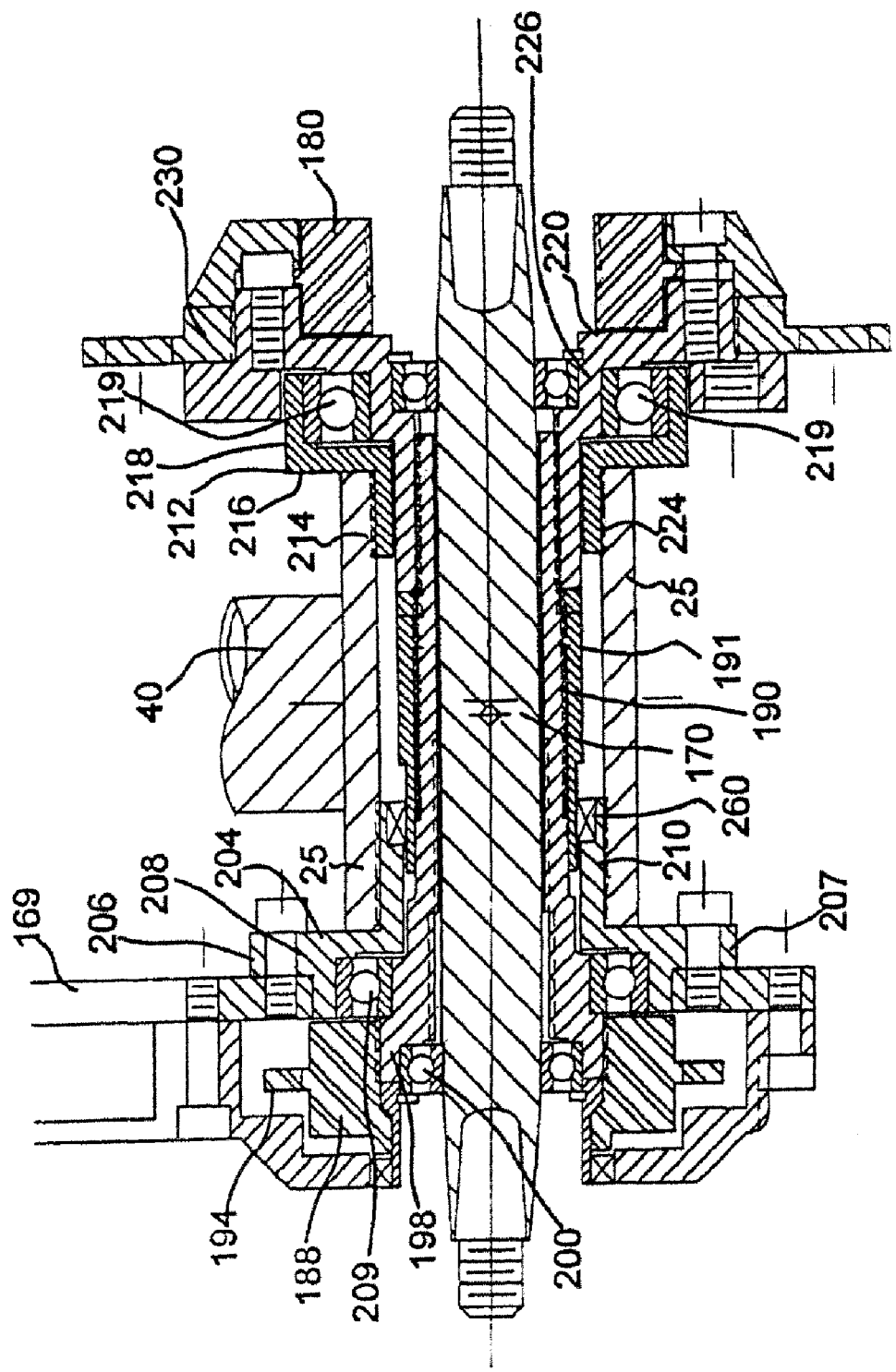
FIG. 4 is a sectional view of the power assist output section of FIG. 1.

Reference is now made to FIGS. 2 and 4 to proceed to a description of the power-assist output section 66 of this embodiment of the invention. There is the existing crank housing 25 which is part of the existing bicycle and this remains as it is. Then as part of the present embodiment of the invention there is added to the bicycle a pedal section crank shaft 170 that is positioned in the crank housing 25. There are right and left crank arms, inner portions of which are shown in FIG. 2 at 172 and 174, respectively, and each of these crank arms has a foot pedal (not shown except in FIG. 1) which is attached to the outer end of its crank arm 172 or 174. The left crank arm 174 connects to the left end of the crank shaft 170. The right end of the crankshaft 170 connects to a hub 178 (see FIG. 2) which in turn engages a pedal driven freewheeling clutch 180 shown somewhat schematically as a rectangular cross section of the clutch 180. The clutch 180 has a threaded drive connection to the hub 178 and a second freewheeling connection to the forward sprocket section 28.

The freewheeling clutch 180 is arranged so that when the bicycle rider is pedaling to move the bicycle forward under power, the two clutch portions of the clutch 180 engage one another in drive relationship to drive the sprocket section 28. However, when the forward sprocket section 28 is rotating faster than the crank shaft 170 or rotating while the pedal section 24 (and the crank shaft 170) is stationary, the freewheeling clutch portion will rotate freely with the sprocket 28.

Near the left end of the pedal crank shaft 170, there is a second freewheeling clutch 188 which connects to the left end of a power-assist shaft section 190. This power-assist shaft section 190 has a tubular generally cylindrical configuration and it concentrically surrounds the crank shaft 170. The power-assist shaft section 190 and the crank shaft 170 collectively comprise a shaft assembly 191. The clutch 188 has a first clutch portion which is provided with sprocket teeth that engage the aforementioned drive chain 168 so that the first clutch portion functions as a sprocket 194. The second inner portion of the clutch 188 is freewheeling.

The clutch 188 is a "left handed version" of the clutch 180 so that when the speed reducing gear section 64 is not being driven by the motor section 62, and the person is pedaling the bicycle, the clutch 188 is free wheeling, but when the second sprocket 194 is driven by the speed reducing gear section 164, the clutch 188 is in its engaged power supplying mode of operation. The second freewheeling portion of the clutch 188 has a second drive connection to the outer surface of the left end portion 198 of the power-assist shaft 190. The left end portion of the power-assist shaft 190 section has a diameter greater than that of the main portion of the shaft 190. A bearing member 200 is positioned in this left end portion 198 to provide support for the left end of the crank shaft 170.

Positioned concentrically around the shaft section 190 immediately to the right of the clutch 188 and fixedly connected by threads to the left end of the crank housing 25 is an adapter member or connecting adapter 204 to connect the connecting plate 169 to the crank housing 25. This adaptor 204 comprises a radially outwardly extending perimeter flange 206 and a forwardly extending cylindrical flange 208, supporting a bearing 209. These two flanges 206 and 208 engage the aforementioned connecting plate 169 which has a through opening by which it is mounted by bolts 207 to the flange 206. The adapter member 204 also has a rearwardly extending cylindrical flange 210 which has outer threads to enable it to thread into the left end of the crank housing 25.

For convenience of illustration, only the inner connecting portions of the two crank arms 172 and 174 are shown only in FIG. 2 and not in FIG. 4. To summarize briefly, the power-assist shaft section 190 has a "freewheeling" connection to the drive connection to the speed reducing gear section 64. The crank shaft 170 has at its left end a connection to the left crank arm 72. However, the right end of the crank shaft 170 has a drive connection to the inner portion of the right crank arm 174.

At the right end of the crank housing 25, there is a right adapter member 212, which comprises a cylindrical connecting portion 214 which has external threads which engage the inner threaded surface portion of the right end portion of the crank housing 25. The adapter member 212 also comprises a radially extending flange portion 216 that connects to a rearwardly extending cylindrical flange portion 218 within which is positioned a bearing member 219 to provide support for the right end portion of the power-assist shaft 190.

Connected to the right end of the power-assist shaft section 190, there is a sprocket connecting member 220 (also called a carrier flange 220) which comprises a forwardly extending cylindrical connecting member 224 having interior threads to engage the right end portion of the power-assist shaft section 190. This carrier flange 220 has an outwardly stepped portion 226 outside of which is the aforementioned outer bearing member 219 to provide support for the right end portion of the power-assist shaft 190.

The sprocket connecting member 220 further comprises a sprocket mounting portion 230 which is fixedly attached to the carrier flange 220. Additional sprockets could also be mounted to the member 230.

Let us turn our attention now to the power-assist shaft 190 which was mentioned earlier in this text. One of the potential problems in installing the system of this embodiment in a bicycle is that the length of the crank housing 25 may be different for different models of bicycles. This creates a problem in the preloading of bearings or interference. This power-assist shaft section 190 is designed to alleviate this problem.

Figure 5:
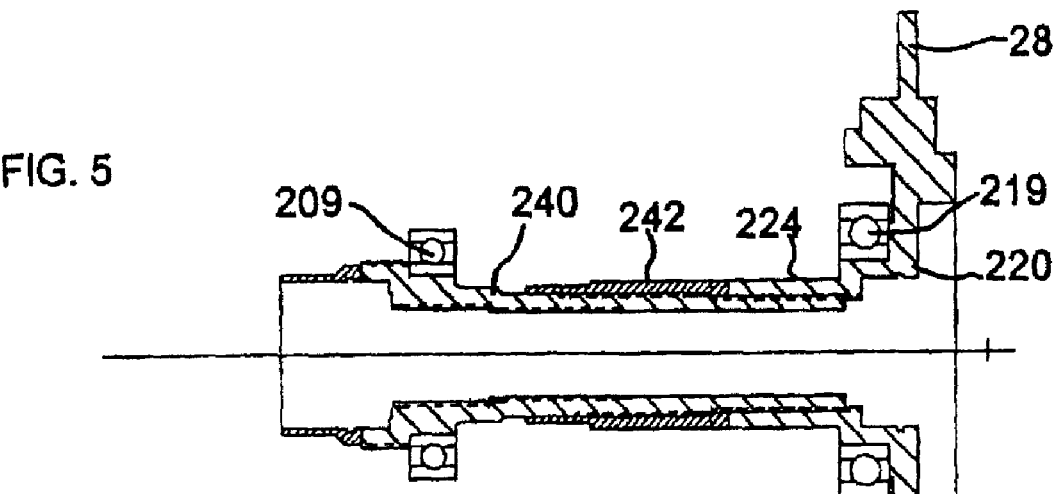
FIG. 5 is a side sectional view of the power assist shaft assembly of the power assist output section.
Figure 6:
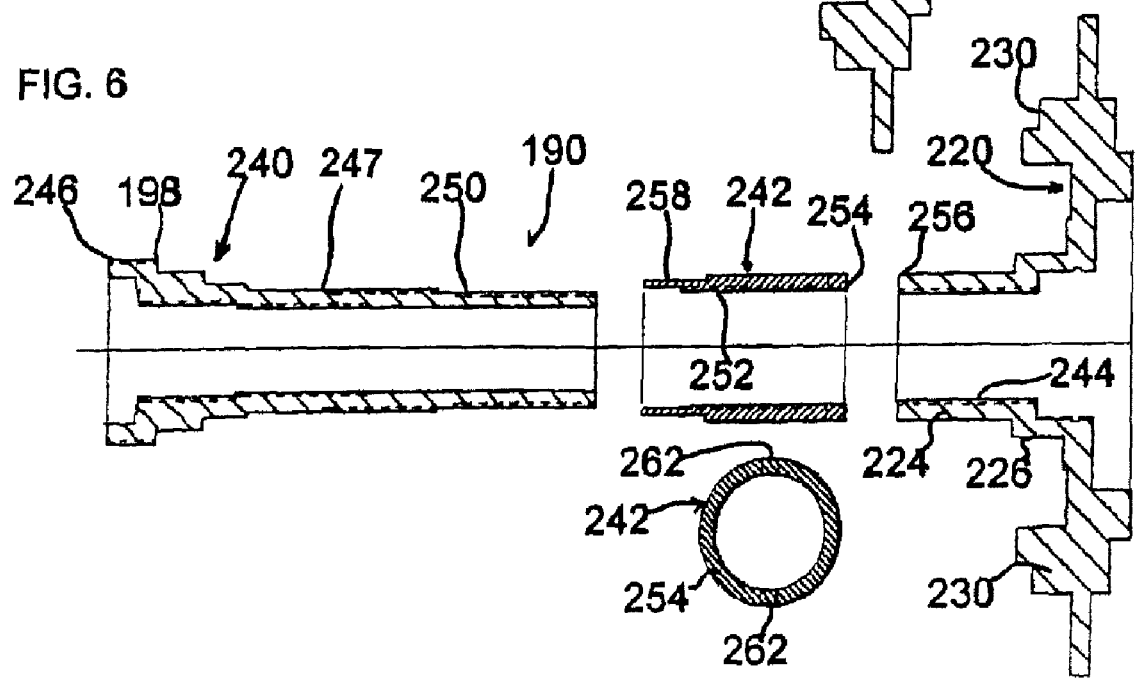
FIG. 6 is an exploded sectional view of the same components of FIG. 5.

To discuss the power-assist shaft section 190 further, reference is made to FIG. 5 and FIG. 6. This power-assist shaft section 190 comprises the aforementioned right carrier flange 220, and also a left drive sleeve section 240, and a middle position adjustment section 242 (also called the adjustment sleeve 242).

As indicated previously in this text, the carrier flange 220 comprises the previously mentioned cylindrically shaped connecting member 224. This connecting member 224 has a set of interior left hand threads 244.

The main drive sleeve section 240 has at its left end portion as previously mentioned, a left end power input 198 which has external left hand threads 246 that engage the inner section of the left clutch 188. As indicated previously in this text, the left clutch 188 connects to, and is driven from, the power-assist speed reducing gear section 64, and the power from this left clutch 188 is transmitted through the power-assist shaft section 190 to a right hand location to provide power to the carrier flange 220.

This main drive sleeve section 240 has three sets of external threads, namely the above-mentioned left hand threads 246 of the left end power output, a second central position set of right hand threads 247 which are used for position adjustment, and immediately to the right a third set of left hand threads 250 which connect to the interior threads 244 of the connecting collar portion 224 of the carrier flange 220 so that it can drive the carrier flange 220 and drive the sprocket section 26.

The position adjustment section 242 is cylindrically shaped, and this has a set of internal right hand threads 252 which engage the central set of right hand threads 247 of the main drive sleeve section 240. The thread sections 252 and 247 are position adjustment positioning threads. The right circumferential edge surface of the position adjustment section 242 functions as an abutment surface 254 which is positioned to engage a matching abutment surface 256 of the connecting member or collar 224 of the carrier flange 220. The positioning adjustment section 242 has at its left end a cylindrical extension portion 258 having a thickness dimension slightly less than its main body portion having the interior threads 252. This extension portion 258 engages a seal which is shown in FIG. 4 and indicated by numeral 260.

Also, there is at the right abutment edge surface 254 of the positioning section 242 a pair of notches 262 (see FIG. 6A) which can be engaged by a matching wrench which would have two diametrically opposed fingers that fit into these notches 262. Thus, during assembly the wrench could be inserted and rotated one way or the other to thread the positioning adjustment section 242 to the desired position.

With the components of the power-assist shaft section 190 having now been described, let us now turn our attention to the manner in which it may be assembled in the crank housing 25.

We shall assume that the original crank shaft and the pedal section 24 have been removed from the crank housing 25 so that there is nothing in the crank housing 25 or extending therefrom. The first step is to engage the adapter 204 with its bearing 209 and the seal 30 by inserting the bearing 209 in the operating position in the adaptor and also place the seal 260 in its operating position at the end of the adapter 204. Then the adapter 204 is inserted into the left side of the crank housing 25 and threaded into the crank housing 25 to its operating position, as shown in FIG. 4.

The next step is to substantially repeat this same step with the right connecting adapter 212 and its bearing 219, namely to mount the bearing 219 into its operating position in the connecting adapter 212, then to insert it into the right side of the crank housing 25, and thread the adapter 212 into its operating position as shown in FIG. 4.

Then the tubular main drive sleeve 240 is inserted into the crank housing 25 from the left side thereof, and pushed inwardly until it buts against the inner race of the bearing 209.

Then the adjustment sleeve 242 is inserted into the right end of the adapter 212 and rotated so that it begins to come into threaded engagement with the threads 247 at the rear end of the drive shaft 240. Then a two pronged wrench is then used to continue the rotation of the sleeve 242 as discussed previously until the adjustment sleeve 242 bottoms out. As the adjustment 242 is moving to its "bottom out" position, the extension portion 258 of the adjustment sleeve moves into its position within the seal 260. One of the reasons for rotating the adjustment sleeve 260 until it does bottom out is to make sure that the extension portion 258 has come into proper engagement with the seal 260.

The next step is to adjust the position of the adjustment sleeve 242. However, before getting into the details it may be helpful to pause in this step-by-step presentation and provide some comments on these components that are involved. It will be noted that the internally threaded portion 252 of the position adjustment section 242 has a slightly greater diameter than the external threads 250 of the drive sleeve section 240. Thus, the interior threads 252 of the position adjustment section 242 are able to engage the central position threads 247 of the drive sleeve section 240.

The threads 247 are right hand threads, and these engage the matching right hand threads 252 of the positioning member 242. The rear positioned threads 250 of the main drive sleeve section 240 are left hand threads which match the left hand threads 244 of the collar portion 224 of carrier flange 220.

To turn our attention back to the adjustment sleeve 242, if adjustment is needed, then the carrier section 222 is removed, and the tool is used to rotate the position adjustment member 242 to a more desired position. This can be done by pre-measure or in a "hit and miss" fashion until a happy medium is found. With regard to the "pre-measure" method, if the pitch of the threads is already known, then the distance by which the right and left pedal sections are properly spaced can be measured. When these dimensions are known, then the proper number of rotations of the position adjustment section 242 could be made so that the adjustment sleeve 242 is moved precisely to provide the proper length dimension.

With regard to the advantages of this design, in earlier designs it would be necessary to have shims of different dimensions being positioned between abutting surfaces. It would usually be desired to have the tolerance be as close as five thousandths of an inch, and this would make it necessary to have a variety of shims at different widths to get precise dimensioning.

With the adjustment sleeve 242 properly in place, the rest of the components can be assembled in the arrangement as shown in the accompanying drawings.

In this embodiment these shims are not needed. Also, an advantage of this embodiment of the invention is that since it can precisely position the components, there would be very little shifting laterally from the axis of rotation. If there is a lack of clearance or too much, or there is some slight lateral shifting, this subjects the components to interference lateral loads so that it would preload the bearing surfaces. This would cause the bearings to deteriorate rapidly.

With the regard to the materials of the components of this embodiment, the following members are made from steel, namely gears, seal sleeves, high load small diameter shafts, and counterweights. The following members are made of aluminum, namely, housings, moderately loaded shafts, carrier flange and drive tube shafts. The reason for certain components being made of steel occurs when high loads require maximum strength. Aluminum is used to reduce weight, cut costs and to provide long tool life. For example, one reason that the member 242 is made of steel is that the forward extension 258 can properly provide a hard and polished surface with the seal member 260.

To describe the overall operation of the present invention, let us assume first that the rider is on the bicycle and pedaling the bicycle under human power, without any power-assist. As the cyclist pushes on the pedals to cause rotation of the crankshaft 170, the clutch member 180 in this mode has its first and second clutch portions in driving engagement so that the clutch 180 drives the forward sprocket section 26 to deliver power to the rear wheel 16.

At the same time, the power-assist shaft section 190, being fixedly connected to the forward sprocket section 26, also rotates at the same speed as the crankshaft 170. However, with the power-assist apparatus 60 not operating, the first clutch portion of the freewheeling clutch 188 is not rotating, but the freewheeling portion of the clutch member is free to rotate with the power-assist shaft 190.

Now let us assume that the bicycle 10 is starting to go up the hill, and the rider wants to have the power-assist operating in addition to his pushing on the pedals. The motor 62 would be started, and the control lever for the throttle of the motor 62 would be positioned at a convenient location, such as at the handlebar. As the speed of the motor 62 increases, an automatic engine clutch engages, and the speed of rotation of the output sprocket 164 also increases. At such time as the rotational speed of the outer sprocket member 194 matches rotational speed of the power-assist shaft 190, the two portions of the clutch members 180 and 188 will be in driving engagement, so that power is delivered from the motor 62 to the power-assist shaft 190 and into the forward drive sprocket 28. The clutch members 180 and 188 are one way clutches. Thus, the rider would still be pedaling and would still be exerting a drive force through the pedal assembly, while the power-assist apparatus 60 would be providing additional power to maintain the desired bicycle speed up the hill. However, if the rider stops pedaling, the power-assist cannot forcibly drive the pedal crank arms, and the clutch 180 would be freewheeling, thus providing a substantial safety factor.

Now let us assume that the bicycle rider has reached the top of the hill and is traveling over a level pathway or road. If the rider is feeling some fatigue and wishes to take a "breather", the rider can simply stop pedaling. In this instance, the motor section 62 would still be operating, and power would still be delivered to the power-assist shaft 190. The clutch 188 would be operating in its drive mode, while the clutch 180 would be operating in its freewheeling mode. Thus, the power-assist cannot forcibly drive the pedal crank arms, thus (as indicated above) providing a substantial safety factor.

Now, let us assume the bicycle is coasting downhill without any power-assist and with the pedals 176 stationary. In this operating mode, both of the clutches 180 and 188 are freewheeling. Also for added safety there is usually a free wheeling clutch at the rear wheel hub.

Also, it should be recognized that another advantageous feature is that with the motor 68 being operated at a very high RPM, the torque of the output of the motor 68 is relatively very small compared to the torque at the output of the speed-reducing gear section, this reducing stress on the bicycle frame.

Figure 7:
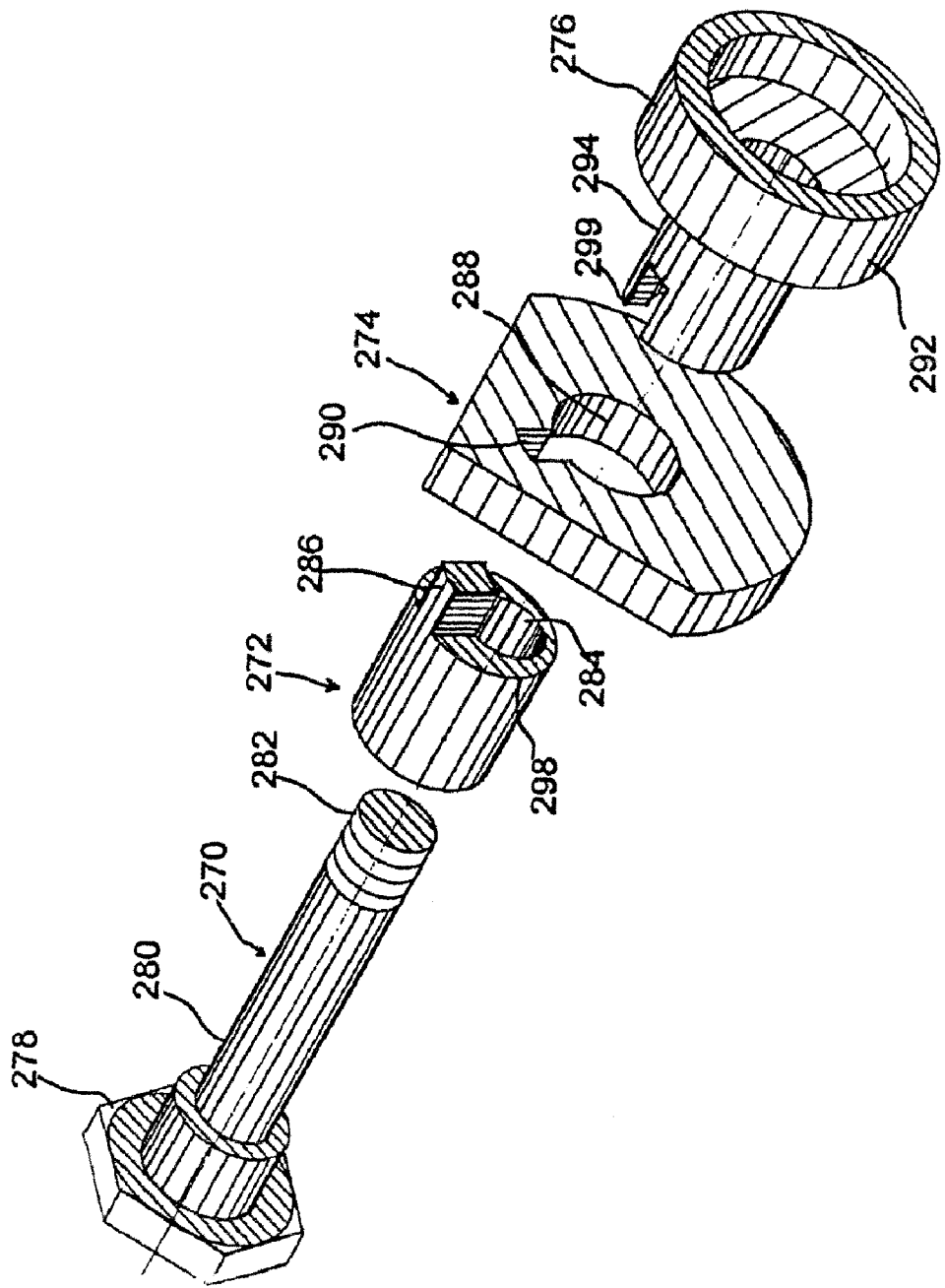
FIG. 7 is an isometric view of a modified arrangement of certain components of the speed reducing gear section of FIG. 3.

FIG. 7 is an isometric drawing showing a modified construction of some of the components of the speed reducing gear section 64. For ease of explanation, there will be no attempt to match the numerical designations in FIG. 7 with the various numerical designations that appear earlier in this text. Rather, these will simply be described with numerical designations not previously appearing in this text.

There are in all four components which are shown in FIG. 7, namely, a center shaft 270, an eccentric sleeve 272, a counterweight 274, and an input adapter 276. For ease of illustration the input adapter 276 is shown only schematically, and in an actual apparatus, this member 276 would be structured to be compatible with the components shown in FIG. 3 that are to the right of the counterweight shown in FIG. 3 at 118.

The shaft 270 is centered on the main axis of rotation, and it comprises a head 278 and a shank 280 having a threaded end portion 282. The eccentric sleeve 272 has an offset cylindrical through opening 284 which is centered on the axis of the shaft 270. The eccentric sleeve has a longitudinally extending connecting member 286.

The counterweight 274 has a center opening 288 and a connecting slot 290 that is aligned with a connecting member 286 of the eccentric sleeve 272. Finally, the input adaptor 276 has an outer cylindrical member 292 which is adapted to make a connection to another component, and this has a centrally extending cylindrical inner member 294 which fits through the opening 288 of the counterweight 274. Further, this center member 294 is arranged so it extends all the way through the opening 288, so that its end portion abuts against a surface 298 of the eccentric sleeve 272. The member 294 also has recess 299. In the connected position the connecting member 286 extends through the connecting slot 290 and inwardly engages the recess 299. This is designed to correctly time and drive the counter weight and the eccentric drive.

A second embodiment of the present invention will now be described with reference to FIGS. 8 and 9.

Figure 8:
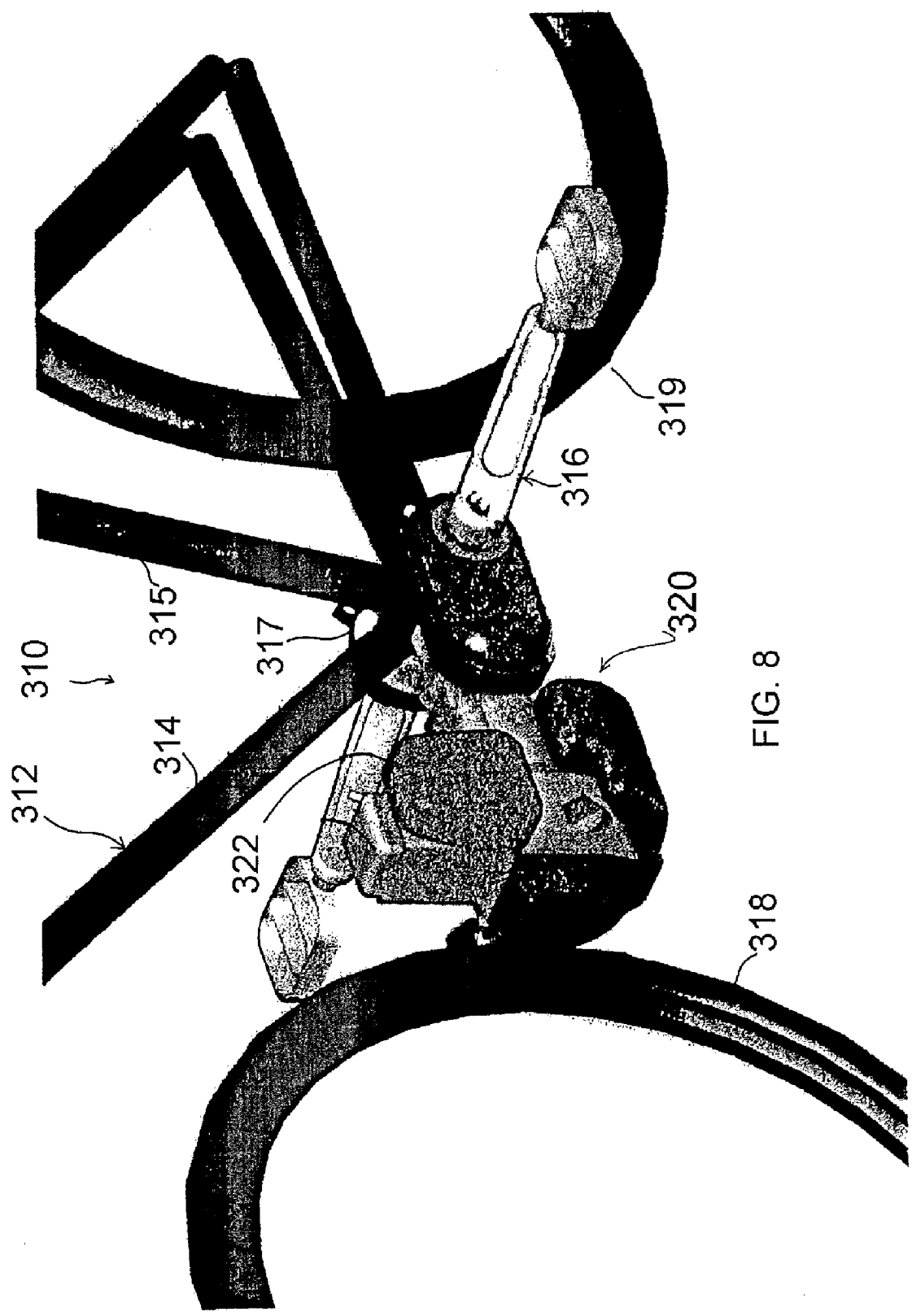
FIG. 8 is an isometric view of a lower part of a bicycle incorporating the components of a second embodiment of the present invention.

In FIG. 8, there is shown a lower part of a bicycle 310 having a bicycle frame 312 which is, or may be, similar to the bicycle frame of the first embodiment. There are front and rear frame members 314 and 315, respectively. The bottom part of the two frame members 314 and 315 meet at a connecting location 317 at which the lower end portions of these frame members 314 and 315 connect directly to one another or connect to a component which is at this connecting location. There is also a pedal-section 316 having a center axis of rotation which in this embodiment is adjacent to the lower connecting portions of the two frame members 314 and 315. The bicycle has front and rear wheels 318 and 319.

Figure 9:
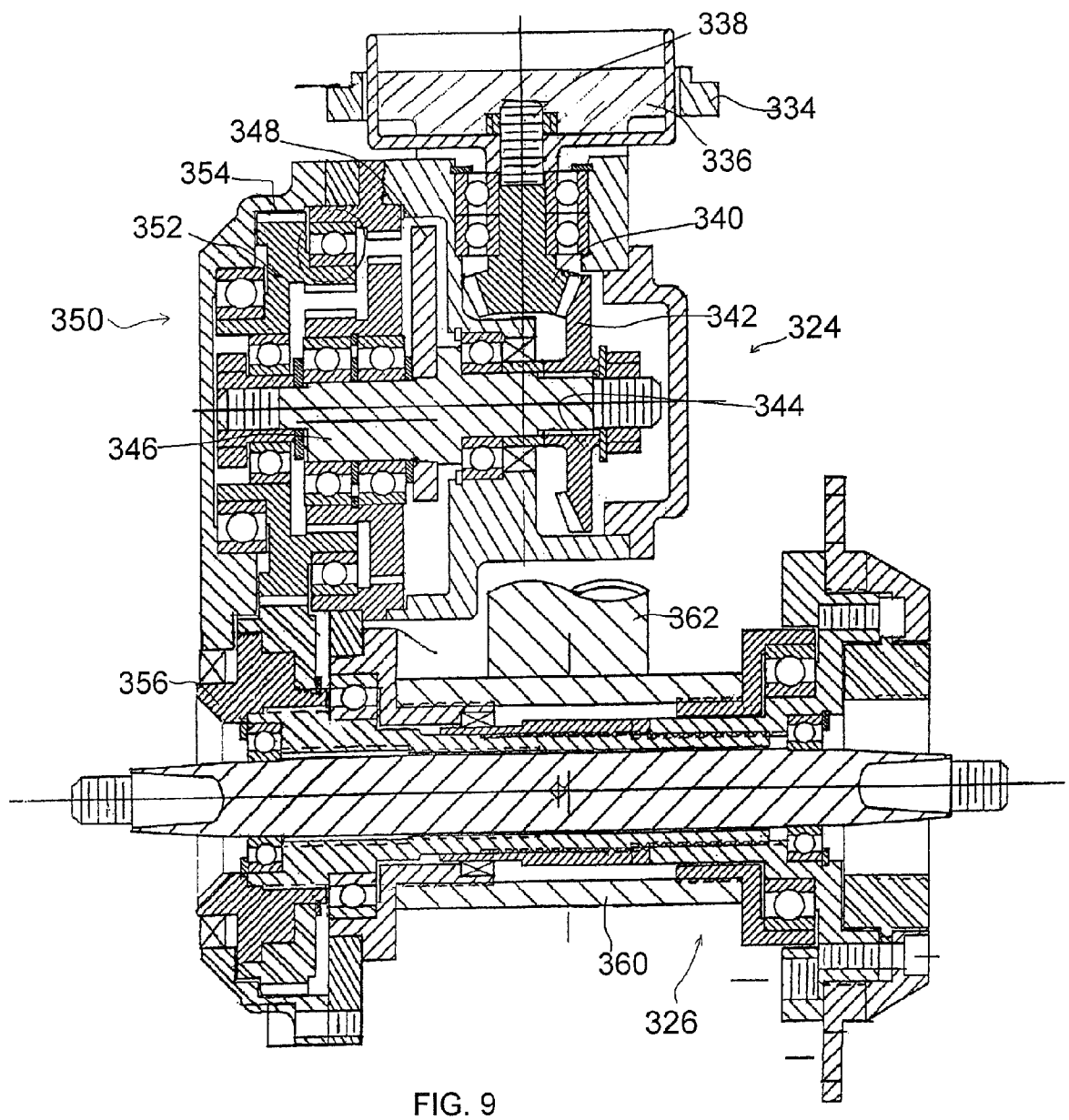
FIG. 9 is a cross-sectional view that is taken from a plane extending through two axes of rotation of components of the second embodiment of the present invention.

The power-assist apparatus 320 of this second embodiment comprises a motor section 322 (see FIG. 8), a speed-reducing section 324, and a power-assist section 326 (see FIG. 9 for sections 324 and 326). The motor section 322 is located adjacent to (and located rearwardly from) the rear part of the front wheel, and forwardly of the front frame member 314. The speed-reducing section 324 is closer to the axis of rotation of the peddle section 316, and the power assist section 326 is located so that its main center axis of rotation is coincident with the center axis of rotation of the peddle-section 316.

Reference is now made to FIG. 9 to describe the speed-reducing section 324. There is a power input connection 334 in which is located a centrifugal-clutch 336. An output portion of the clutch 336 connects to a threaded connecting input-shaft 338 that comprises a pinion-gear 340. The pinion-gear 340 connects to a bevel-gear 342 which in turn drives the main output-shaft 344 through a spline-connection.

The output-shaft 344 has an eccentric-shaft portion 346. In the first embodiment, the eccentric-shaft portion was made as a separate member. In this embodiment, the eccentric-shaft portion 346 is formed integrally with the output-shaft 344. There is also a counter-weight 348 and (as in the first embodiment) this is mechanically attached to the output shaft. Located at a more forward portion of the power-input shaft 344 there is a cluster-gear section 350 with components of an eccentric-drive section similar to those components indicated at 136 and 128 in the first embodiment. However, the cluster-gear section 350 differs from that which is in the first embodiment in that the gear portion of a smaller diameter and the one with a larger diameter have their respective positions reversed in this second embodiment.

There is an output-drive member 352 which is driven from the shaft driving the cluster-gear section. The member 352 has an overall circular configuration and rotates about the axis of rotation of the output-shaft 344. This output-drive member 352 has its circumference formed with gear teeth to form an exterior spur-gear 354 which has a drive-connection to an overrunning clutch 356 which serves the same function as the overrunning clutch 188 of the first embodiment.

The power-assist section 326 of this second embodiment is (or may be) exactly the same as the power-assist output-section 66 of the first embodiment. Therefore, there will be no detailed description of the configuration and operation of this power-assist section 326.

In this second embodiment, the power-assist output-section has its axis of rotation coincident with the main-center axis of the pedal-section 316, and the speed-reducing section 324 extends in a forward direction toward the front-wheel when installed in the bicycle. FIG. 9 is a cross-sectional configuration with the plane of the cross-section being aligned horizontally. Thus, in viewing FIG. 9, the upper part (as seen in FIG. 9) of the speed-reducing section at the connecting location of the shaft 338 would be positioned forwardly of the location of the crank-housing 360.

To provide a clarification of what is shown in FIG. 9, there is shown a tubular support member 362 which would be part of the bicycle frame, and this member 362 connects to the crank housing 360. As shown herein, this tubular member 362 extends horizontally. However, with the apparatus being installed on the bicycle, this frame member 362 would extend upwardly from the crank-shaft 360.

Figure 3:
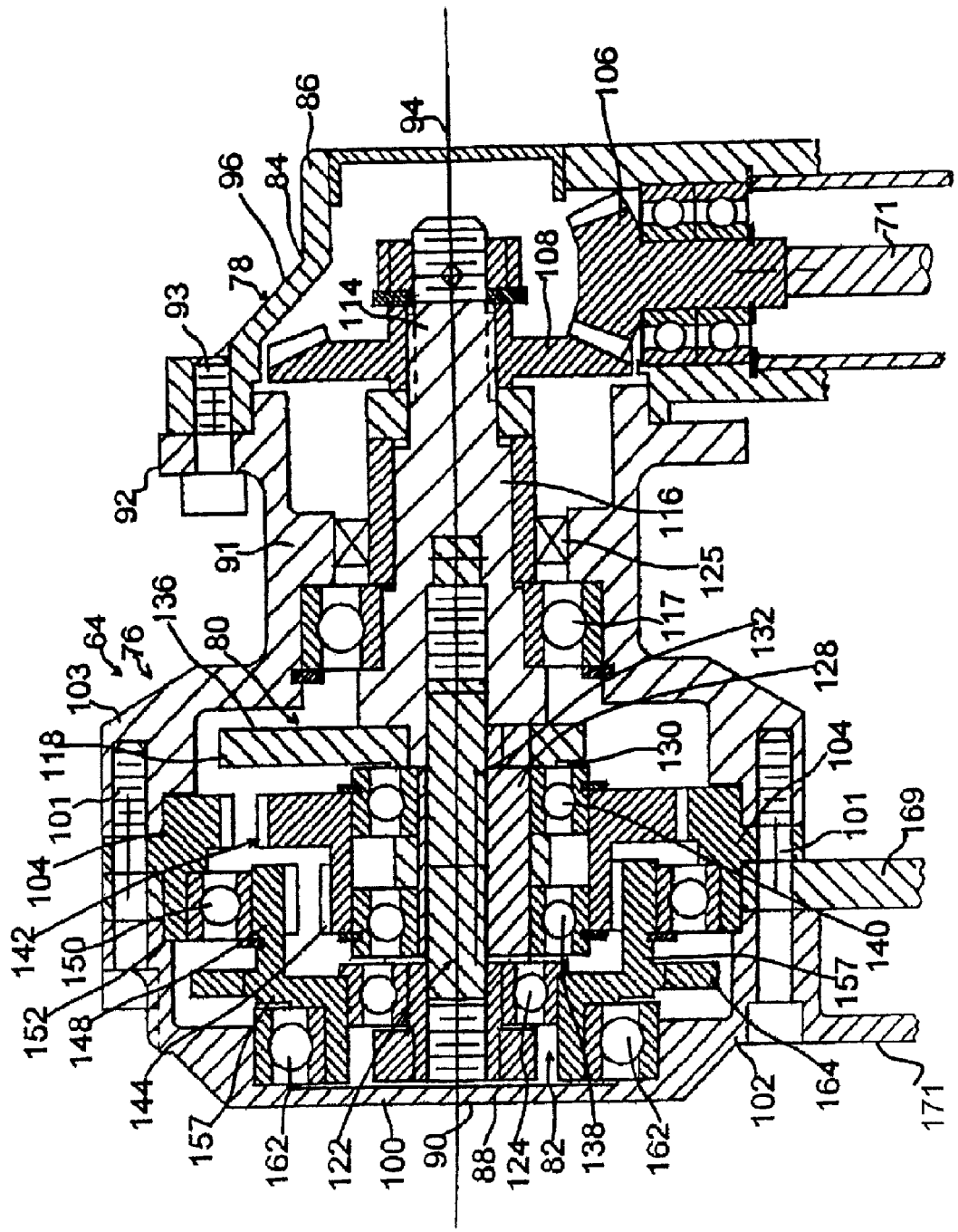
FIG. 3 is a sectional view of the speed reducing power section of the power assist apparatus of FIG. 1.

It is evident from comparing FIG. 3 of the first embodiment with FIG. 9 of the second embodiment that there are substantial similarities in the structure and operation of these speed-reducing gear-sections. Accordingly, it is believed that the operation of the second embodiment can readily be understood from the information which is given in the first embodiment.

Figure 10:
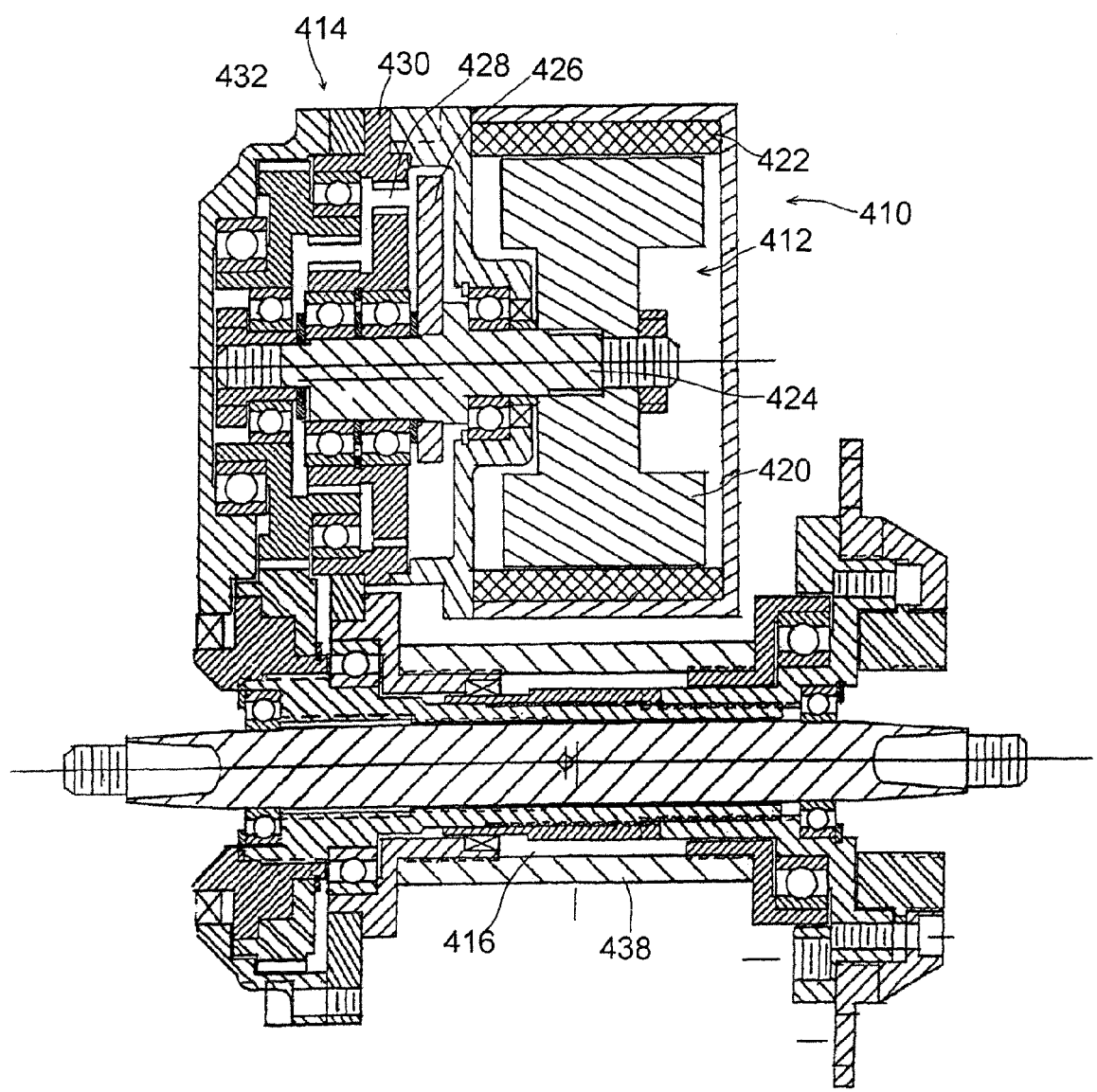
FIG. 10 is a cross-sectional view of two components of a third embodiment of the present invention, similar to the view taken in FIG. 9.

A third embodiment of the present invention will now be described with reference to FIG. 10. In FIG. 10, there is shown the apparatus 410 comprising a motor section 412, a speed-reducing gear-section 414, and a power-assist section 416.

This third embodiment is similar to the second embodiment in that it can be located at a forward lower location of a bicycle frame in substantially the same manner as shown in the second embodiment. However, it differs from the second embodiment in that in this third embodiment invention there is provided an electric motor 418 which functions as the motor section. This electric motor comprises a rotor 420, and a stator 422.

The rotor 420 attaches to a drive-shaft 424. As in the second embodiment, the drive-shaft 424 has a counter-weight 426. There is also a cluster-gear 428 that is positioned around the drive-shaft 424 and rotates around an eccentric-drive portion of the shaft 424. There is a ring-gear 430 which comes into engagement with the cluster-gear 428.

The cluster-gear assembly ultimately drives an output-drive member 432 which corresponds to the output-drive member 352 of the second embodiment. As in the second embodiment this output-drive member 432 is in the form of a spur-gear and has a set of gear teeth located on its circumference.

In this third embodiment, the power-assist section 416 is (or may be) the same as (or similar to) the power-assist section 326 of the second embodiment.

The aforementioned overrunning clutch 436 has its overrunning clutch-portion engaging the gear-teeth 434 of the output-drive member 432. The power-assist section 416 is positioned inside of the crank housing 438 and is aligned with the center axis of the crank housing 438.

It is evident in comparing the drawings and text relating to the second embodiment to the drawings and text of this third embodiment the third embodiment is (except for having the electric motor), that the third embodiment is quite similar (or nearly the same as) the second embodiment. Accordingly, it is believed that the operation of this third embodiment can be readily understood from the information which is given in the descriptive text and drawings of the second embodiment, and also to some extent to the first embodiment.

It is obvious that various modifications could be made to the presently shown embodiments without departing from the basic invented features thereof.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

I claim:

1. A pedal- and motor-assist power system for a bicycle which has, at least one drive wheel, and a bicycle frame with front and rear ends, said system comprising:
    a) a pedal section comprising:
        i. first and second pedal members;
        ii. a crank shaft connecting the pedal members;
        iii. a crank housing in which the crank shaft is located;
    b) a sprocket section having a chain-and-sprocket drive connection to said drive wheel;
    c) a motor section;
    d) a speed-reducing drive section connecting to said motor section and having a drive output;
    e) a power-assist drive section comprising a power assist drive member concentrically mounted around said crank shaft and having a power-assist drive connection between the drive section drive output and the sprocket section;
    f) said system being characterized in that the sprocket section has a first pedal overrunning drive connection with said pedal section and the power-assist drive connection has a second overrunning drive connection; whereby said bicycle is able to operate in four operating modes, namely:
        i. a power-assist mode where a bicycle rider is pedaling to supply power, and the power-assist section is providing power;
        ii. a pedal-only mode where power is being supplied solely by pedaling the bicycle;
        iii. the power-assist-only mode where the bicycle rider is not providing power by pedaling, but power is supplied by the power output section;
        iv. a coasting no-power mode where the bicycle is traveling with the pedal section stationary, and no power is being supplied by either the pedal section or the power-assist drive section, and g) said power-assist drive member having a tubular configuration with first and second power-assist member portions on opposite sides of the bicycle, said power-assist drive member and said crank housing being positioned concentrically around a center axis of said crank shaft; and h) said power-assist drive section comprising a length adjustable power-assist drive section comprising a power-assist mid-section positioned between said first and second power power-assist portions, and power-assist position adjustment member mounted to the power-assist mid-section so as to be movable to different positions along the power-assist mid-section in a manner that the distance between the two first and second power-assist portions, are adjustably spaced apart whereby the power-assist system could be used in bicycles having different width dimensions in a drive-section of the bicycle.

2. The apparatus according to claim 1, said power-assist mid-section has a threaded connection to said power-assist adjustment member so that relative rotation between said power-assist mid-section and said power adjustment member causes the movement of the power-assist adjustment member is moved to different positions.

* * * * *